Dec. 27, 1949  C. F. BJORK  2,492,835
TRAP WIRE IGNITER
Filed Dec. 13, 1946
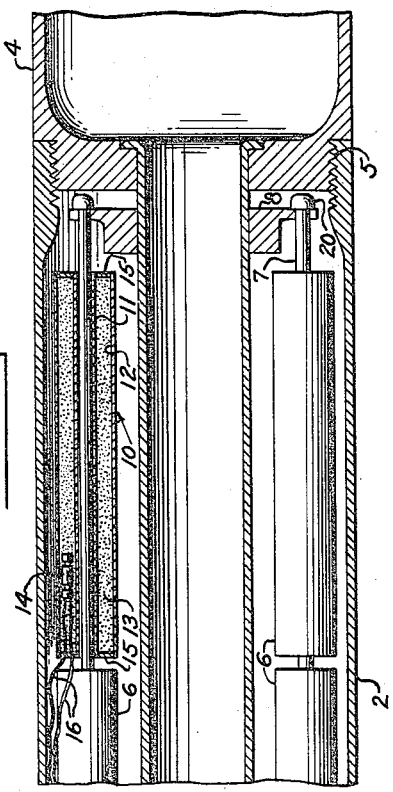
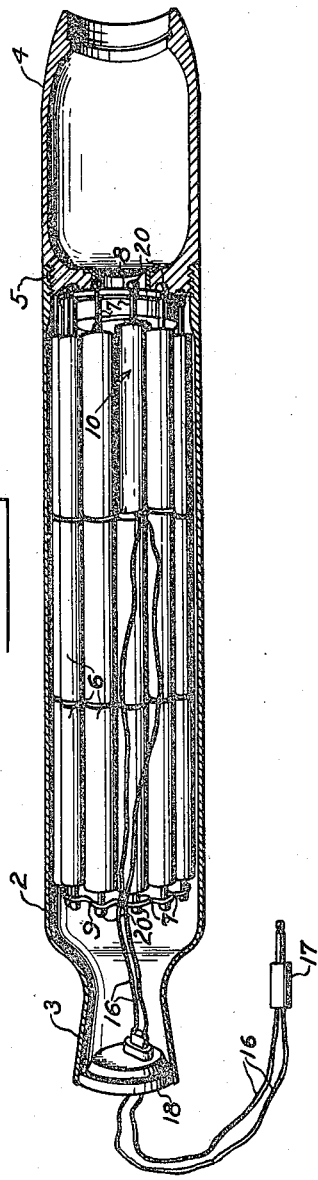
INVENTOR.
Carold F. Bjork
BY
ATTORNEYS Patented Dec. 27, 1949

2,492,835

UNITED STATES PATENT OFFICE 2,492,835

TRAP WIRE IGNITER

Carold F. Bjork, Long, Md., assignor to the United States of America as represented by the Secretary of War Application December 13, 1946, Serial No. 716,071

3 Claims. (Cl. 102—49)

This invention relates to ignition devices for rocket ordnance and more particularly to an improved electrically-operated igniter for rocket propellants.

Igniters for jet propelled devices such as rocket projectiles generally consist of a suitable cloth bag, plastic cup or tube, or other suitable container filled with black powder plus an electric squib for igniting the powder. In these arrangements, however, considerable difficulty is met in obtaining substantially uniform and simultaneous ignition of the propellent charge. This is especially true when utilizing a propellent charge comprising a plurality of long cylindrical grains of double base powder strung on trap wires within the rocket motor. Moreover difficulty has also been experienced in assembling an igniter in those rocket motors which utilize such trap wire arrangement for the propellent charge.

It is therefore an object of this invention to provide an improved igniter assembly for rocket motors.

It is a particular purpose of this invention to provide an improved igniter assembly especially adapted for rocket motors utilizing a trap wire type of propellent charge.

The specific nature of the invention as well as other objects and advantages thereof will clearly appear from a description of a preferred embodiment as shown in the accompanying drawings in which:

Fig. 1 is a cross-sectional view of a rocket motor having a trap wire type propellant and the igniter assembly of this invention.

Fig. 2 is an enlarged fragmentary view of Fig. 1 showing the details of the igniter assembly; and Fig. 3 is a perspective view of the construction of the igniter tube.

In Fig. 1 there is shown a rocket projectile comprising a tubular rocket motor casing 2 one end of which terminates in a nozzle 3 of conventional Venturi construction. A head 4 is secured to the forward end of casing 2 as by threads 5. The head 4 is hollow and contains a "pay load" which may consist of a high explosive or a chemical grenade.

The rocket propellant includes a plurality of grains 6 of a double base powder or the like held on trap wires 7. Such trap wires form a cage having a trap plate or ring member 8 secured to head 4 by suitable means and another ring member 9 at the nozzle end of the propellant. The trap wires 7 are preferably shaped to have enlarged upset ends 20 in order to secure these wires to rings 8 and 9.

An igniter assembly 10 is mounted on one of trap wires 7 in the place of a powder grain 6 near the forward end of the propellent charge. The igniter 10 is hollow and cylindrical in shape and is composed of two tubes of equal length but of different diameters so that when one tube 11 is inserted within the other tube 12, a space is defined therebetween for receiving a charge of black powder 13 and an electrically-operated squib 14 is embedded therein. The tubes may be made of any suitable material which will not leave an undue amount of residue after ignition, such as cellulose acetate or any suitable cellulosic material. On each end of igniter assembly 10 there is sealed, preferably by means of a suitable cement, a washer 15 having the outside diameter thereof equal to the inside diameter of outer tube 12 and having the washer aperture equal to the outer diameter of inner tube 11.

Squib 14 is of the conventional type and is provided with electrical leads 16 extending rearwardly through the propellent assembly and through a cap 18 which is sealed in nozzle 3 by means of a suitable cement. Leads 16 terminate in a plug-type connector 17. The igniter 10 may be made in any desired length or diameter in order to obtain as much black powder as may be necessary for the proper ignition of the propellent charge in the particular rocket motor in which it is to be used. The igniter 10 is readily assembled within the rocket by placing the former over one of the trap wires 7 prior to placing the rocket motor casing 2 over the propellent assembly.

Tests indicate that the use of the trap wire igniter described above results in the development of higher maximum and average pressures and slightly shorter burning times in typical rocket projectiles than with the type of igniters used heretofore.

I claim:

1. In apparatus for igniting rocket propellants, the combination comprising, a plurality of trap wires for supporting cylindrical propellent grains, an igniter tube mounted on one of said trap wires at the forward end thereof, said tube comprising an inner and outer cylinder defining an annular space therebetween for receiving a charge of black powder and a squib embedded therein, and means connecting said squib to a source of electricity whereby said squib is adapted to be fired.

2. In apparatus for igniting the propellant in a rocket motor, the combination comprising, a plurality of trap wires for supporting cylindrical propellent grains, a trap plate at either end of said trap wires whereby said trap wires are supported in the form of an annular cage, an elongated hollow inner cylinder of cellulosic material within a substantially coextensive outer cylinder of identical material and enclosing a forward portion of one of said trap wires, a charge of black powder contained between said inner and outer cylinders, a squib embedded in said black powder, and means connecting said squib to a source of electricity whereby said squib is adapted to be fired.

3. In apparatus for igniting tubular grains of double-base propellant in a rocket motor, the improvement comprising, a pair of tubes of cellulosic material, one of said tubes of greater diameter than the other but of the same length whereby the insertion of said smaller tube into said larger tube defines a space therebetween, a charge of black powder in said space and an electrical firing squib embedded therein, a pair of washers of cellulosic material similar to that of said pair of tubes, each of said pair of washers having an outer diameter equal to the inner diameter of said larger tube and an aperture through said washer equal to the outer diameter of said smaller tube, all adapted and arranged whereby sealing each of said washers at the ends of said pair of tubes forms a hollow igniter cylinder.

CAROLD F. BJORK.

REFERENCES CITED

The following references are of record in the file of this patent:

UNITED STATES PATENTS

| Number | Name | Date |
|---|---|---|
| 2,404,190 | Pope | July 16, 1946 |
| 2,422,090 | Fuess | June 10, 1947 |

FOREIGN PATENTS

| Number | Country | Date |
|---|---|---|
| 503,078 | France | Mar. 8, 1920 |